No. 729,144. PATENTED MAY 26, 1903.
J. P. DONOVAN.
WHEEL TIRE.
APPLICATION FILED FEB. 7, 1903.
NO MODEL. 3 SHEETS—SHEET 1.

Witnesses

Inventor
John P. Donovan,
By Winter, Taft & Tilley,
Attorneys

No. 729,144. PATENTED MAY 26, 1903.
J. P. DONOVAN.
WHEEL TIRE.
APPLICATION FILED FEB. 7, 1903.
NO MODEL. 3 SHEETS—SHEET 2.

Witnesses
F. A. Leutter
J. S. Taft Jr.

Inventor
John P. Donovan,
Attorneys

THE NORRIS PETERS CO., PHOTO-LITHO., WASHINGTON, D. C.

No. 729,144. PATENTED MAY 26, 1903.
J. P. DONOVAN.
WHEEL TIRE.
APPLICATION FILED FEB. 7, 1903.
NO MODEL. 3 SHEETS—SHEET 3.

Witnesses

Inventor
John P. Donovan,

Attorneys

No. 729,144. Patented May 26, 1903.

UNITED STATES PATENT OFFICE.

JOHN P. DONOVAN, OF WESTFIELD, MASSACHUSETTS.

WHEEL-TIRE.

SPECIFICATION forming part of Letters Patent No. 729,144, dated May 26, 1903.

Application filed February 7, 1903. Serial No. 142,280. (No model.)

*To all whom it may concern:*

Be it known that I, JOHN P. DONOVAN, a citizen of the United States of America, residing at Westfield, in the county of Hampden and Commonwealth of Massachusetts, have invented a new and useful Wheel-Tire, of which the following is a specification.

My invention relates to improvements in tires for automobile and other vehicle wheels, in which perforated plates of leather, rubber, fabric, paper, and the like formed into a tire or into sections or blocks which enter into the tire formation are employed, the plates or sections being reinforced with peculiarly-arranged springs; and the object of my improvement is to provide a strong, durable, and tough tire which cannot be punctured in the sense that the term "puncture" is here employed when subjected to ordinary use and may be attached to or united with any of the well-known styles of rim, the tire possessing the requisite amount of flexibility or elasticity.

A further object is to afford means for fastening the plates together and to the rim of the wheel.

The vital defects in an inflated tire are its liability to puncture and lack of durability, efforts to remedy which have resulted in the production of heavy, rigid, and generally impracticable tires having an inadequate amount of elasticity or else tires incapable of standing up under the strain of the wear and tear to which they are naturally subjected. Much difficulty has been experienced too in properly attaching some tires to the rim. My invention overcomes all such defects and difficulties in a practicable and efficient manner.

I attain the above-noted objects by the means illustrated in the accompanying drawings, in which—

Figure 1:
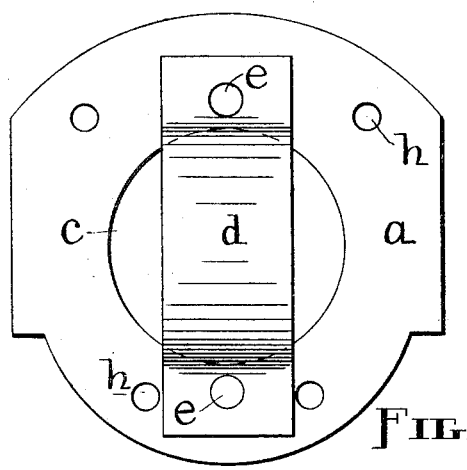
Figure 2:
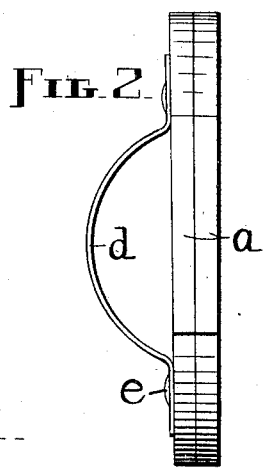
Figure 3:
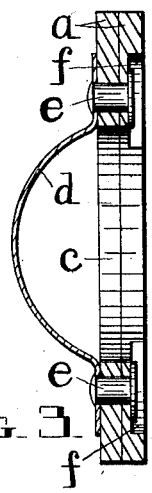
Figure 4:
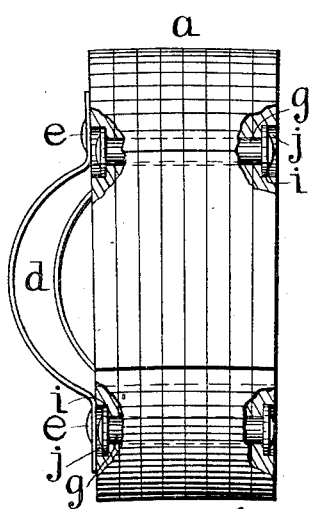
Figure 5:
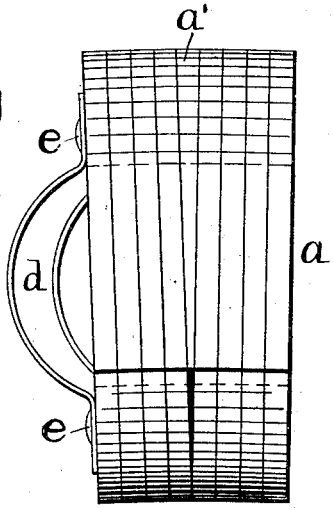
Figure 7:
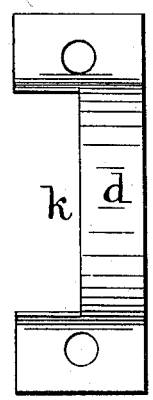
Figure 6:
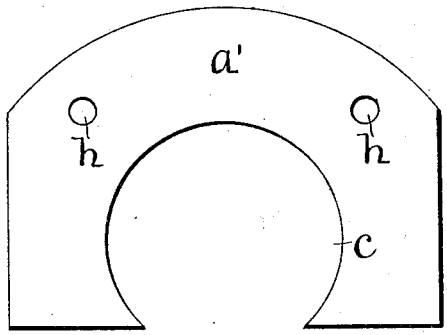
Figure 8:
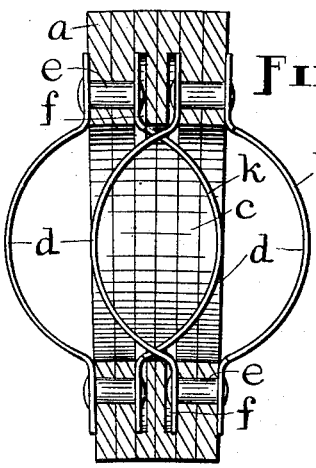
Figure 9:
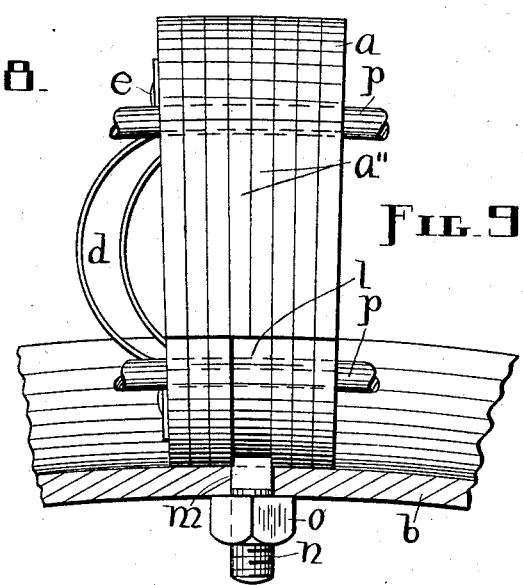
Figure 10:
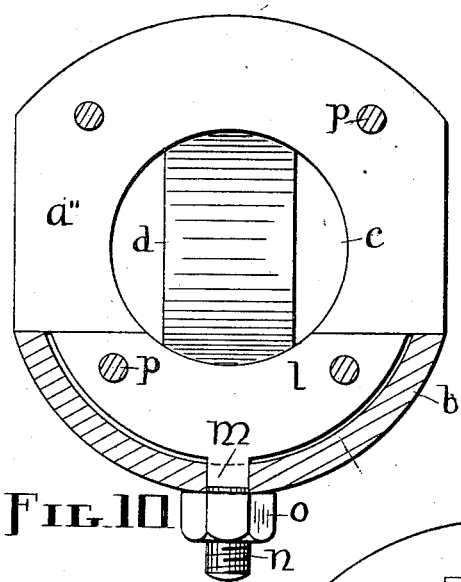
Figure 11:
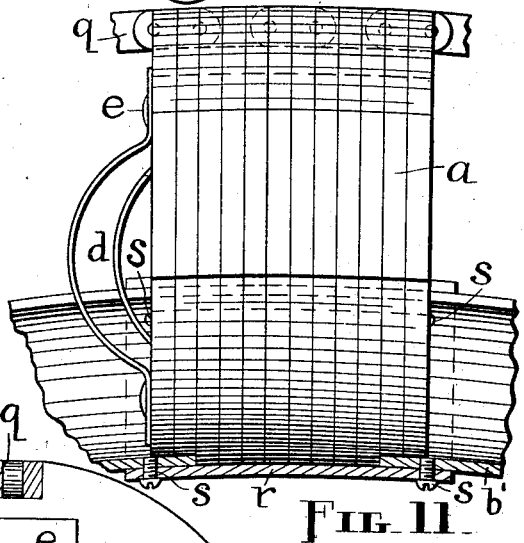
Figure 12:
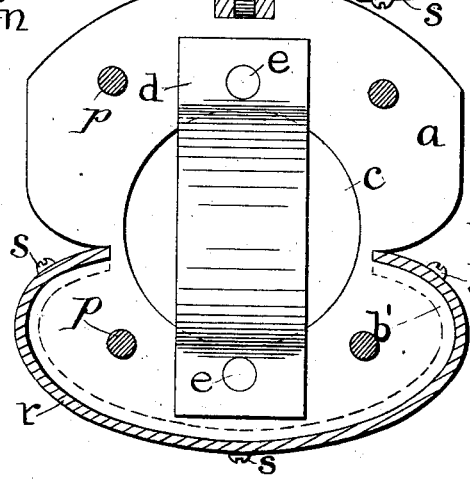

Figure 1 is a side view of one of the tire-forming plates and a spring; Fig. 2, an edge view of two of such plates and the spring, the plates being united into a section by the rivets which hold the spring in place; Fig. 3, a central vertical cross-section through said biplate-section; Fig. 4, an edge view of a block made up of several sections, broken away adjacent the ends of the uniting-rivets; Fig. 5, an edge view of a modified form of block or segment; Fig. 6, a side view of the mutilated plate used in the preceding figure; Fig. 7, a side view of a modified spring; Fig. 8, a central vertical cross-section through a block, showing the application of the modified spring; Fig. 9, a sectional view of a portion of a rim having a segment of the tire mounted therein, illustrating one method of fastening the tire to the rim; Fig. 10, a cross-section through the rim, taken at the left of the fastening segment; Fig. 11, a sectional view of a clencher-rim having a segment of a suitably-formed tire mounted therein; Fig. 12, a vertical cross-section through the clencher-rim, taken between two plates; and Fig. 13 a sectional view of a rim and of an internal band, showing how the tire may be held to the rim by securing the springs to said band.

Similar letters refer to similar parts throughout the several views.

Generally speaking, my invention consists of a multiplicity of yielding plates each having a rather large opening therein arranged crosswise of the wheel-rim, the bases of said plates adapted to be accommodated to said rim, springs arranged across the openings and adapted to yield in the direction of the radii of the wheel, means to unite the plates, and means to secure the same to the rim. In order to meet the requirements of rims of different shapes and sizes, sustain greater or less loads, and withstand various kinds of strains, it will be necessary to alter the shape and size of the tire-plates, make departures in the matter of fastening means, both those which unite the plates and those which join the tire to the rim, and otherwise change the construction. A number of such alterations and changes have been illustrated and will be described; but it is to be understood that all possible constructions which fall within the scope of my invention are not set forth herein, nor would it be possible to present them in detail without unnecessarily and unduly encumbering the case. Nevertheless I seek to include and cover all modifications and mechanical equivalents to which I am entitled under the law.

Proceeding now to describe the invention in detail and with reference, first, to the component parts of the tire itself, a plate *a* is cut out of leather or other suitable material of any desired thickness and approved shape, the latter being dependent to some extent upon the shape of the rim with which the plate is to be associated. If the plate $a$ is to be applied to an ordinary rim $b$, its bottom or inner edge is curved to fit the exterior curve in cross-section of said rim, and lateral flanges may be provided to bear against the peripheral edges of the rim, as best shown in Fig. 10. For the clencher-rim $b'$, however, the lower part of the plate is elliptical, so as to conform to the exterior curve in cross-section of this rim and present lateral channels for the reception of the overturned edges thereof, as best shown in Fig. 12. In order to render the plate $a$ flexible, an opening $c$ of any suitable size and shape is made therein, the distance from the upper or outer edge or tread of the plate and the adjacent edge of said opening being regulated to suit any given requirement. A spring $d$, adapted to yield toward the center of the wheel, preferably bow-shaped, is attached by its ends to one side of each plate $a$ or to one side of two or more plates, generally two, which are held together by rivets $e$ $e$, used also to secure the spring. An indentation $f$ may be formed for the head of each rivet $e$ in the plate in which said head is located, said indentation being deep enough to also receive the end of the spring $d$ on the adjacent plate and permit contiguous plate-surfaces to come tight together. The plates, held together by the rivets $e$, constitute what is herein termed a "section." The springs $d$ are arranged across the opening $c$ and serve to strengthen or stiffen the plates or sections and at the same time afford flexibility. In short, the required bulk and a part of the flexibility and resiliency of the tire may be said to be furnished by the plates, while the springs afford the balance of the necessary flexibility and resiliency.

For convenience in assembling a plurality of plates or sections may be fastened together by means of rivets $g$ passing through holes $h$, washers $i$ being used with the rivets, as shown in Fig. 4. Indentations $j$ may be here provided in the outside plates, so that the ends of the rivets shall not project beyond the faces thereof. This assembly of parts is called a "block."

Instead of bolting the plates or sections together to make blocks they may be united by means of screws or stitching, gluing, or vulcanizing, if rubber enters into their composition, may be resorted to, and there is no reason why a complete tire of rubber may not be vulcanized. Formation into blocks is merely a matter of convenience applicable in some cases, and I do not wish to be restricted to any particular method for such formation nor to the formation itself.

As a rule the plates are slightly tapered—that is, the edge of each at the tread is thicker then the edge at the center of the rim; but they may be of uniform thickness and a tapered short or mutilated plate $a'$, Figs. 5 and 6, inserted in the tire, such mutilated plates being introduced at sufficiently frequent intervals to produce a substantially regular periphery.

The springs $d$ may be arranged to bow out either in the same general direction or in opposite directions; but in the latter case their width must be decreased if they are to be located close together, or they may be recessed at $k$, Figs. 7 and 8, which is the preferred construction, for the reason that the ends then remain of the same width as before. In Fig. 8 is illustrated one method of arranging the parts with the recessed springs turned in opposite directions and their bows overlapping. Two springs are here riveted to opposite sides of one section, and depressions $f$ for the ends of the springs and of the rivets are formed in opposite faces of the adjoining section. It will be readily seen how other formations comprising oppositely-disposed springs may be made up by increasing or decreasing the number of intervening plates.

The plates may be attached to the tire $b$ by using a rigid segment $l$, provided with an angular lug $m$, having a threaded extension or screw $n$, with which a nut $o$ is engaged, Figs. 9 and 10. The thickness of the segment $l$ should correspond with that of one or more plates at the inner part, and the corresponding plate or plates $a''$ are cut off even with the straight outer edges of said segment, said edges being about on a line with the outer edges of the rim. The inner curved edge of the segment $l$ is less than that of the plates for the reason presently to be given. Wires $p$, which encircle the rim, pass through suitable holes in the plates at each side of the lower holes $h$, if blocks are used, and through corresponding holes in the segment $l$. The lug $m$ is received in an angular hole in the rim, and the screw $n$ projects inwardly from said rim. Now when the nut $o$ on the screw $n$ is tightened against the rim the segment $l$ is drawn inward and wedges the plates firmly into place through the medium of the wires $p$, which can be done in a satisfactory manner, because the adjacent edge of said segment never comes into contact with the rim, or at least not before the plates are seated. When drawn inward, the plates become firmly wedged in the direction of the circumference of the tire, owing to the taper given either them or the mutilated plates $a'$, and the fastening device holds them tightly in the rim, so that all liability to "creep" laterally is obviated. Of course several segments $l$ and associated parts are required for a complete tire and rim. In the absence of the block formation other wires $p$ may be run through the outer holes $h$, or blocks may be strung on these additional wires by providing additional holes for them.

The plates or sections are bent together sufficiently to enable them to be sprung into the clencher-rim $b'$, which holds them very firmly without it being necessary generally to have recourse to internal wire or other binding mediums, although they may be used, if desired; but in this application of my invention I may notch the peripheral or tread edges of the plates and pass a wire or chain $q$ around the tire in the channel so formed and draw it tight. A strong bond is not only thus made, but the durability of the tire enhanced, because this wire or chain forms the tread thereof. The peripheral wire or chain bond may also be advantageously applied to other forms of my tire. In Fig. 12 internal binding-wires $p$ are shown, as well as the external chain $q$.

As an auxiliary feature in the construction of the clencher-rim tire a segment of the rim $b'$ may be cut out to allow the last instalment of plates to be inserted in the tire, and then this breach is closed by means of a slide $r$, which is slipped along into place and fastened with screws $s$ or otherwise. (See Figs. 11 and 12.) The slide $r$ closely embraces the rim $b'$, and when normally disposed and attached by fastening means to the ends of said rim at opposite sides of the break in the latter serves to complete the same and render it as substantial as a continuous rim. The thickness of the rim should be added to the length of the plates which fill the before-mentioned breach and provision made therein and in certain of the other adjoining plates for the reception of the overturned edges of the slide.

Instead of inserting the major portion of the plates into the rim $b'$ in the manner hereinbefore described they may all be introduced between the severed ends of said rim.

Figure 13:
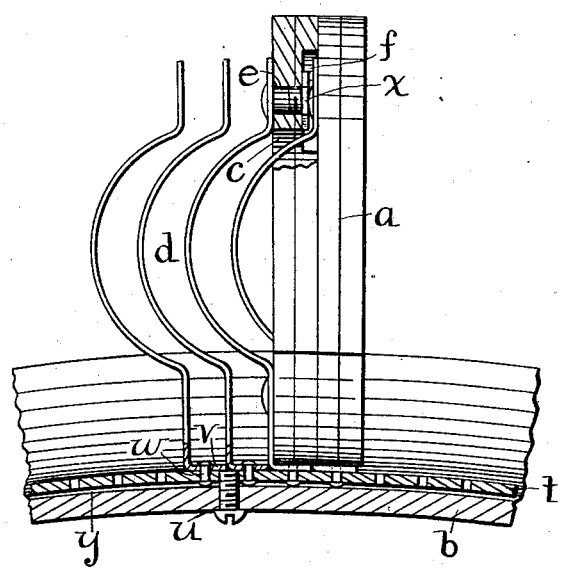

Passing now to a consideration of the modified fastening means illustrated in Fig. 13, it will be seen that the springs to which the plates or sections are attached are fastened to a band in the rim-channel. The band $t$, which encircles the floor of the tire-channel, is held in place by screws threaded through the rim $b$ and said band and arranged at intervals, one such screw being shown at $u$. Each spring is provided with a foot $v$, standing at substantially a right angle with the general direction of the spring, and these feet are secured to the band $t$ by rivets $w$. The plate-sections are riveted to the springs in the manner already explained, except that a thin nut $x$ may be threaded to each rivet to form the head, so as to permit said sections to be attached to the springs after the latter are in place around the rim. The band $t$ is shown flat in cross-section, and also that portion of the floor of the rim-channel which receives said band; but of course these parts with the spring-feet can be curved in cross-section, if desired. An annular groove $y$ is formed in the rim to accommodate the inner ends of the rivets $w$, the opposite ends of said rivets being received into suitable recesses provided in the tire. It is obvious, of course, that the tire, including the band, may be made up first and then attached to the rim.

Leather or fabric plates may be impregnated with waterproof material, and such material may be introduced into the annular chamber formed by the walls of the openings $c$.

What I claim as my invention, and desire to secure by Letters Patent, is—

1. As a new article of manufacture, a wheel-tire plate of yielding material adapted to be accommodated to a rim crosswise, having an opening therein, and a spring arranged across said opening in the direction of a wheel radius and attached to said plate.

2. The combination with a wheel-tire plate adapted to be accommodated to a rim crosswise, having an opening therein, of a spring attached to said plate and extending across said opening, the plate and spring adapted to yield under pressure toward the center of the wheel and return to normal condition when the pressure is removed.

3. The combination with a wheel-tire plate adapted to be accommodated to a rim crosswise, having an opening therein, of a bow-shaped spring across said opening with its ends fastened to said plate, the plate and spring adapted to yield under pressure toward the center of the wheel and return to normal condition when the pressure is removed.

4. As a new article of manufacture, a wheel-tire section adapted to be accommodated to a rim crosswise, comprising a plurality of united yielding plates having an opening through the same with a spring arranged across said opening in the direction of a wheel radius and attached to the side or face of one of said plates.

5. A wheel-tire comprising a multiplicity of yielding plates adapted to be accommodated to a rim crosswise, having openings therein constituting a continuous annular chamber, and springs attached to the faces of some or all of said plates across the openings and arranged in the directions of the wheel radii.

6. A wheel-tire comprising a multiplicity of yielding plates adapted to be accommodated to a rim crosswise, having openings therein constituting a continuous annular chamber, and bow-shaped springs attached at their ends to the faces of some or all of said plates and arranged in the directions of the wheel radii, the bows of said springs extending into said chamber.

7. A wheel-tire comprising a multiplicity of yielding plates adapted to be accommodated to a rim crosswise, having openings therein constituting a continuous annular chamber, and bow-shaped springs attached at their ends to the faces of some or all of said plates and arranged in the directions of the wheel radii, the bows of said springs extending into said chamber in different directions.

8. A wheel-tire comprising a multiplicity of yielding plates adapted to be accommodated to a rim crosswise, having openings therein, springs arranged across some or all of said openings in the directions of the wheel radii, and means for uniting said plates.

9. A wheel-tire comprising a multiplicity of yielding plates adapted to be accommodated to a rim crosswise, having openings therein, springs arranged across some or all of said openings in the directions of the wheel radii, and internal means for uniting said plates.

10. A wheel-tire comprising a multiplicity of yielding plates adapted to be accommodated to a rim crosswise, having openings therein, springs arranged across some or all of said openings in the direction of the wheel radii, and external means adapted to unite said plates and serve as a tread for the tire.

11. A wheel-tire comprising a multiplicity of yielding plates adapted to be accommodated to a rim crosswise, having openings therein, springs arranged across some or all of said openings in the directions of the wheel radii, internal means for uniting said plates, and peripheral means for the same purpose.

12. The combination with a wheel-rim, of a tire comprising a multiplicity of yielding plates adapted to be accommodated to said tire crosswise, having openings therein, springs arranged across some or all of said openings in the directions of the wheel radii, and means to attach said tire to the rim.

13. The combination with a wheel-rim, of a tire comprising a multiplicity of yielding plates adapted to be accommodated to said tire crosswise, having openings therein, springs arranged across some or all of said openings in the directions of the wheel radii, means to unite said plates, and means to attach said tire to the rim.

In testimony whereof I have signed my name to this specification in the presence of two subscribing witnesses.

JOHN P. DONOVAN.

Witnesses:
F. A. CUTTER,
A. L. STEVENS.